US010613109B2

(12) United States Patent
Ando

(10) Patent No.: US 10,613,109 B2
(45) Date of Patent: Apr. 7, 2020

(54) DISPENSING APPARATUS

(71) Applicant: HITACHI, LTD, Chiyoda-ku, Tokyo (JP)

(72) Inventor: Takahiro Ando, Tokyo (JP)

(73) Assignee: HITACHI, LTD., Tokyo (JP)

(*) Notice: Subject to any disclaimer, the term of this patent is extended or adjusted under 35 U.S.C. 154(b) by 227 days.

(21) Appl. No.: 15/865,044

(22) Filed: Jan. 8, 2018

(65) Prior Publication Data

US 2018/0348247 A1 Dec. 6, 2018

(30) Foreign Application Priority Data

Jun. 1, 2017 (JP) ................ 2017-109266

(51) Int. Cl.
*G01N 35/10* (2006.01)
*B01L 3/02* (2006.01)

(52) U.S. Cl.
CPC ........ *G01N 35/1011* (2013.01); *B01L 3/0241* (2013.01); *B01L 3/0244* (2013.01); *G01N 35/1016* (2013.01); *B01L 2200/0605* (2013.01); *B01L 2200/14* (2013.01); *G01N 2035/1013* (2013.01); *G01N 2035/1034* (2013.01); *G01N 2035/1037* (2013.01)

(58) Field of Classification Search
None
See application file for complete search history.

(56) References Cited

U.S. PATENT DOCUMENTS

| 5,601,980 A * | 2/1997 | Gordon | B01L 3/0262 422/547 |
| 7,875,463 B2 * | 1/2011 | Adaskin | B01J 19/0046 422/509 |
| 7,901,633 B2 * | 3/2011 | Huh | B01L 3/0241 422/403 |
| 2003/0049863 A1 * | 3/2003 | Woodward | B01L 3/0262 436/180 |
| 2005/0084423 A1 * | 4/2005 | Zarowitz | B01L 3/021 422/504 |
| 2013/0280143 A1 * | 10/2013 | Zucchelli | B25J 9/1697 422/501 |
| 2014/0079871 A1 * | 3/2014 | Lu | H05K 3/3484 427/8 |
| 2014/0120192 A1 * | 5/2014 | Nakayama | C12M 21/08 425/135 |
| 2014/0273194 A1 * | 9/2014 | Handique | G01N 21/6428 435/288.7 |
| 2015/0060700 A1 * | 3/2015 | Bjornson | B01L 3/0241 250/461.1 |
| 2015/0308944 A1 * | 10/2015 | Bjornson | G01N 35/1009 250/372 |

FOREIGN PATENT DOCUMENTS

| JP | 3247471 B2 | 1/2002 |
| JP | 2004325329 A | 11/2004 |

* cited by examiner

*Primary Examiner* — Jill A Warden
*Assistant Examiner* — Brittany I Fisher
(74) *Attorney, Agent, or Firm* — Procopio, Cory, Hargreaves & Savitch LLP

(57) ABSTRACT

The objective of this disclosure is to provide a dispensing apparatus that is capable of precisely dispense micro volume liquid samples without physically damaging the nozzle tip or the liquid containers. An example of the present disclosure images a droplet of a liquid sample, and dispenses the liquid sample using an image of the droplet.

11 Claims, 5 Drawing Sheets

DISPENSING APPARATUS

CROSS REFERENCE TO RELATED APPLICATIONS

The present application claims priority from Japanese patent application JP 2017-109266 filed on Jun. 1, 2017, the content of which is hereby incorporated by reference into this application.

BACKGROUND

Technical Field

The present disclosure relates to a dispensing apparatus that dispenses liquid samples.

Background Art

When analyzing liquid biological samples, the liquid sample is sucked into a nozzle, and then the liquid sample is discharged from the nozzle to a component that will hold the liquid sample. Examples of the component holding the liquid sample may include slide glass substrates, array elements, liquid containers, or micro plates. In order to precisely analyze the sample, it is necessary to precisely control the liquid volume of the sample to be discharged.

In DNA micro arrays, hundreds to tens of thousands of biological substances or chemical substances are aligned and fixed at high density on a slide glass substrate having a size of several square centimeters. The sample is analyzed by searching substances that interfere with the substance on the substrate, and by identifying signal patterns of the interfering substance. In order to improve measuring accuracy, it is important to dispense the sample by predetermined volumes precisely.

In order to always provide micro volume of the liquid sample at constant volume rate, typical dispensing apparatuses expose the sample from the tip of the nozzle by a very small volume to form at the nozzle tip a droplet having a very small diameter. This droplet is dispensed onto the dispense target surface.

Patent Literature 1 listed below describes a method for preventing variation of spot sizes that may occur due to contact status between the nozzle tip and the substrate. In Patent Literature 1: the distance between the nozzle and the dispense target surface is kept constant by a locating pin; the nozzle tip does not contact with the dispense target surface; a micro droplet containing proteins is held at the nozzle tip, and the droplet is contacted with the dispense target surface; and the sample is dispensed without contact using surface tension of the droplet.

If the quantitatively analyzed sample is a biological sample such as blood or urine, or when using expensive reagents in analysis, it is desirable to limit the amount of sample up to several micro liters, so that the amount of used reagent is limited. In a case of blood sample, it is difficult to acquire large amounts of the sample. Thus it is desirable if many items can be analyzed using small amount of the sample as small as possible. The amount of biological sample dispensed to one piece of liquid container is necessarily small. In current technologies, a sample volume for performing one analysis may be under 1 microliter. It is necessary to discharge such micro volume sample by a predetermined volume to the liquid container.

Patent Literature 2 listed below describes a method for controlling the sequence of discharge according to the liquid volume discharged to the liquid container. In Patent Literature 2, if the discharged volume is at or less than 5 micro liters, the tip of dispensing nozzle is pressed onto the bottom of the liquid container and then the sample is discharged, so that the sample discharged from the nozzle using the surface tension of the sample can smoothly move to the liquid container. If the discharged volume is more than 5 micro liters, in order to prevent from the peripheral of the nozzle tip being polluted by the discharged sample, the nozzle tip is positioned at several millimeters above the bottom of the liquid container and then the sample is discharged.

RELATED ART DOCUMENTS

Patent Documents

Patent Document 1: JP Patent Publication (Kokai) 2004-325329 A
Patent Document 2: JP Granted Patent No. 3247471

SUMMARY

It is relatively possible to precisely control a plunger that pushes out the sample. However, if the distance between the nozzle tip and the dispense target surface varies, the liquid volume kept on the container may also vary even if same liquid volumes of the sample are discharged, due to factors such as surface tension of the sample. Therefore, in order to precisely control the volume of discharged sample, it is necessary to highly precisely control the relative distance between the nozzle tip and the dispense target surface.

If the accuracy of the relative distance is not sufficient, there could arise failures such as: (a) the nozzle tip continuously contacts with the dispense target surface, thereby damaging the dispense target surface; (b) the analysis begins without the sample being supplied (empty discharge). Especially in a case using disposable nozzles, the accuracy of nozzle fix position is not sufficient, and the accuracy of install positions of the substrate and the container are also not satisfactory. Thus both of those positions may be misaligned at the sample-dispensing position, and then the positional relationship between them could be different for each of dispense actions. Therefore, in order to highly precisely control the relative distance between the nozzle tip and the dispense target surface, it is necessary to precisely measure the relative distance between them. Some of methods for measuring the relative distance are listed below. However, each has problems to be solved.

(a) Distance sensors with high precision such as laser displacement sensors are very expensive, which incurs significant increase of cost for the apparatus. Thus it is difficult to employ such sensors only for measuring the distance between the nozzle tip and the dispense target surface. (b) A method highly precisely detects the liquid surface of the liquid sample, by moving the nozzle closer to the liquid surface of the liquid sample while discharging air from the nozzle tip, and by stopping the movement of the nozzle when the nozzle tip contacts with the liquid surface to stop the air leakage and thus detecting increase of the pressure in the nozzle. However, this method cannot be employed if it is impossible to contact the nozzle with the dispense target surface. (c) A method images the relative distance between the nozzle tip and the dispense target surface using cameras. However, this method images the nozzle from lateral side of the nozzle. Therefore, in a case using small volume containers for containing micro volume samples, it is difficult to highly precisely image proximity of the dispense target surface. In addition, in a case where many droplets are discharged in arrayed manner, the camera is overlapped with other droplets and thus the imaging process itself is hardly performed.

This disclosure is made in terms of the problems mentioned above. The objective of this disclosure is to provide a dispensing apparatus that is capable of precisely dispense micro volume liquid samples without physically damaging the nozzle tip or the liquid containers.

An example of the present disclosure images a droplet of a liquid sample, and dispenses the liquid sample using an image of the droplet.

With the present disclosure, it is possible to precisely dispense micro volume liquid samples without using expensive sensors by identifying a distance between the nozzle tip and the container using the image of the droplet of the liquid sample.

DETAILED DESCRIPTION

<Embodiment 1>

Figure 1:
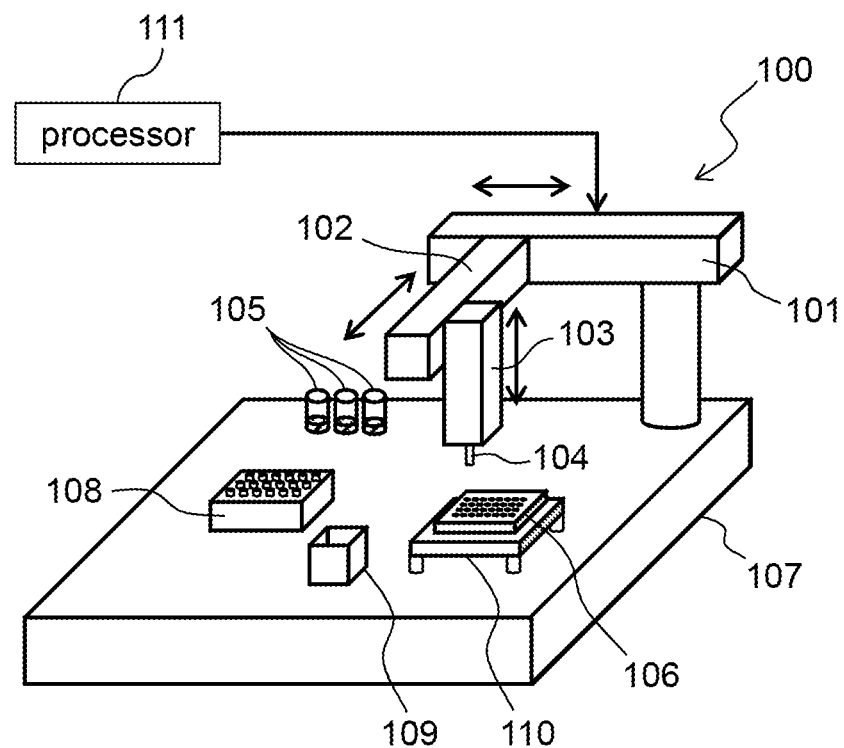
FIG. 1 is a schematic diagram illustrating an overall configuration of a dispensing apparatus 100 according to an embodiment 1.

FIG. 1 is a schematic diagram illustrating an overall configuration of a dispensing apparatus 100 according to an embodiment 1 of this disclosure. The dispensing apparatus 100 includes a base stage 107 that is formed with rigid components. A liquid sample container 105 is placed on the base stage 107. If a nozzle 104 for dispensing the sample is disposable, a before-use disposable nozzle container 108 and an after-use disposable nozzle container 109 may be placed on the base stage 107.

The liquid sample container 105 contains biological samples or reagents. The liquid sample container 105 may include temperature adjusting functionalities for adjusting (e.g. keeping at a predetermined temperature) the temperature of the liquid contained in the liquid sample container 105.

The before-use disposable nozzle container 108 is a container that aligns and contains the (disposable) nozzle 104 before being used. The after-use disposable nozzle container 109 is a container that contains unnecessary liquids remained in the nozzle 104, and that contains the (disposable) nozzle 104 used in the dispensing process.

The dispensing apparatus 100 further includes a dispense head on which the nozzle 104 for the dispensing process is attached, and also includes a X axis direction actuator 101/a Y axis direction actuator 102/Z axis direction actuator 103 for moving the dispense head to any position on the base stage 107. The nozzle 104 installed at the bottom edge of the dispense head sucks the liquid in the liquid sample container 105. The nozzle 104 discharges the liquid to a dispense target 106 such as glass substrates or micro plates. The dispensing process is thus performed.

The dispense target 106 is a component such as slide glass substrates, array elements, or liquid containers. The dispense target 106 is placed on a stage 110. The nozzle 104 discharges the sample to the dispense target 106, thereby dispensing the sample. An imager 301 described later is arranged under the stage 110.

A processor 111 controls behaviors of the dispensing apparatus 100. The processor 111 calculates an amount of movement in the vertical direction for the nozzle 104 according to a sequence described below. The processor 111 controls each of actuators according to the calculated amount, thereby moving the nozzle 104. The processor 111 controls each of actuators according to a description of a data table 113 stored in a storage unit 112 described later.

Figure 2:
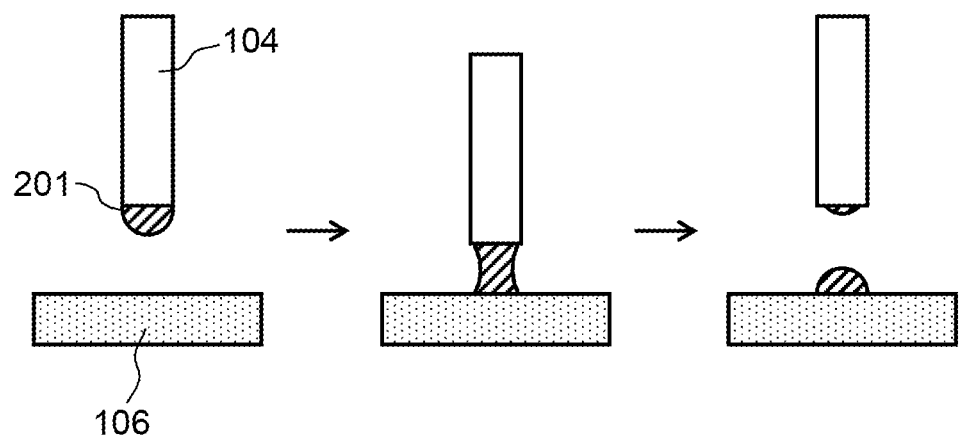
FIG. 2 is a schematic side view illustrating a dispensing behavior by discharging a droplet 201 discharged from a tip of a nozzle 104 to a dispense target 106.

FIG. 2 is a schematic side view illustrating a dispensing behavior by discharging a droplet 201 discharged from the tip of the nozzle 104 to the dispense target 106. The tip of the nozzle 104 may be angled. When a part of the droplet 201 is exposed from the tip of the nozzle 104, the nozzle 104 moves downward to the dispense target 106, so that the droplet 201 reaches the dispense target 106. Then the nozzle 104 moves upward, so that the droplet 201 is placed on the dispense target surface. At least a portion of the dispense target 106 where the droplet 201 is dispensed (and a corresponding portion of the stage 110) is optically transparent so that the droplet 201 is imaged from below.

Figure 3:
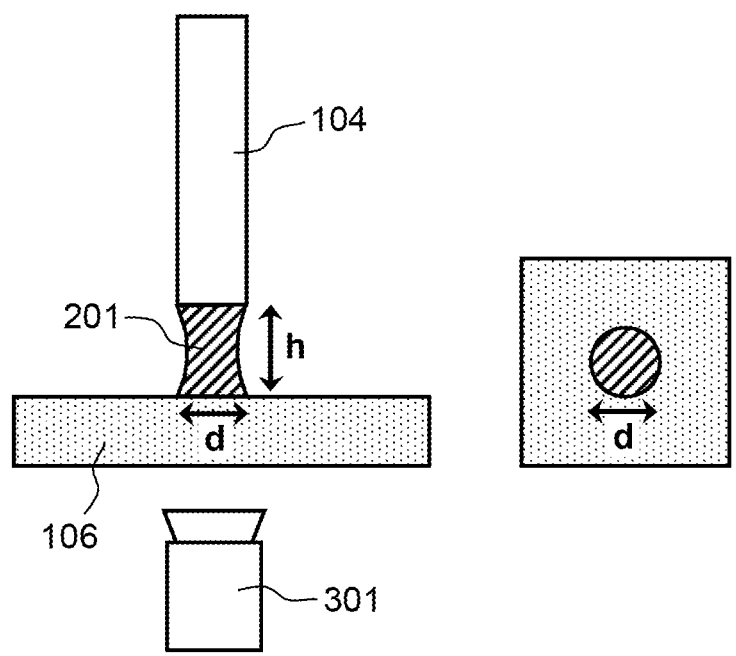
FIG. 3 is a schematic side view illustrating a scene where an imager 301 images the droplet 201.

FIG. 3 is a schematic side view illustrating a scene where an imager 301 images the droplet 201. The imager 301 is placed below the stage 110. The imager 301 images a scene where the droplet 201 discharged from the nozzle 104 is dispensed to the dispense target 106. Now it is assumed that: a planar size (diameter) of the droplet 201 imaged from the imager 301 is d; a relative distance between the tip of the nozzle 104 and the dispense target surface is h. As shown in right diagram of FIG. 3, when seeing the droplet 201 from below the dispense target surface, the droplet 201 has a circular shape due to surface tension of the droplet 201.

Figure 4:
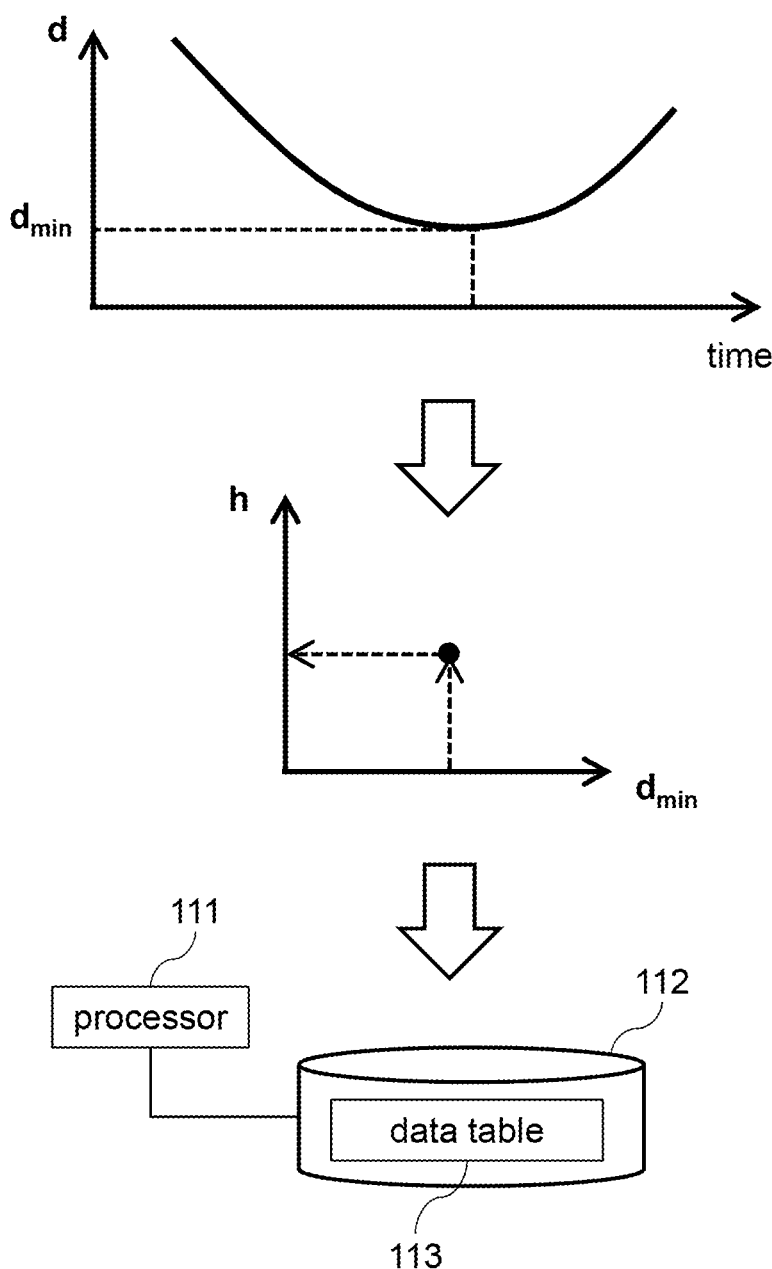
FIG. 4 is a graph illustrating an example of a chronological variation of size d and relative distance h of the droplet 201 while dispensing the sample.

FIG. 4 is a graph illustrating an example of a chronological variation of size d and relative distance h of the droplet 201 while dispensing the sample. After the droplet 201 reaches the dispense target 106, the droplet 201 is pulled by the surface tension of the droplet 201 when the nozzle 104 moves upward, thereby the size d becomes smaller gradually. At the instant when the nozzle 104 is separated from the droplet 201, the size d becomes the smallest value. The size d at this instant is referred to as d=dmin.

If the liquid volume is constant, the shape of the droplet 201 is also constant. In other words, the relationship between the size dmin and the relative distance h is unambiguously determined at the moment when the nozzle 104 is separated from the droplet 201. Then the relationship between dmin and h is described as a data table 113 in advance, and the value of dmin is acquired according to the image of the droplet 201 imaged by the imager 301, thereby it is possible to acquire the corresponding value of h. The nozzle 104 is moved in the vertical direction according to the acquired value of h, thereby same dispensing behaviors may be performed to other ones of the dispense target 106. In other words, it is possible to precisely dispense a micro volume of the droplet 201 without physically damaging the tip of the nozzle 104 or the dispense target 106.

The shape of the droplet 201 may be influenced by parameters other than liquid volume. Thus the relationship between dmin and h may be stored in the storage unit 112 in advance for each combination of parameters below. The processor 111 acquires values corresponding to those parameters from the data table 113, thereby further precisely calculating the value of h.

(parameter 1) sample type: characteristics of the sample such as viscosity vary depending on type of the sample. Such characteristics may influence on the shape of the droplet 201. Thus it is desirable to describe the relationship between dmin and h for each of sample types.

(parameter 2) dispensed volume of sample: The shape of the droplet 201 varies depending on the dispensed volume of the sample. Thus it is desirable to describe the relationship between dmin and h for each value of dispensed volume.

(parameter 3) nozzle inner diameter: The shape of the droplet 201 varies depending on the inner diameter of the nozzle 104. Thus it is desirable to describe the relationship between dmin and h for each value of the inner diameter.

(parameter 4) nozzle thickness: if the side wall of the nozzle 104 is thick, the droplet 201 deforms as if sticking to the thick portion due to the surface tension of the droplet 201. It influences on the shape of the droplet 201. Thus it is desirable to describe the relationship between dmin and h for each value of the thickness of the nozzle 104.

(parameter 5) The strength by which the sample sticks to the dispense target surface varies depending on the material of the dispense target 106. Thus it is desirable to describe the relationship between dmin and h for each material of the dispense target 106.

(parameter 6) dmin (parameter 7) h

Figure 5:
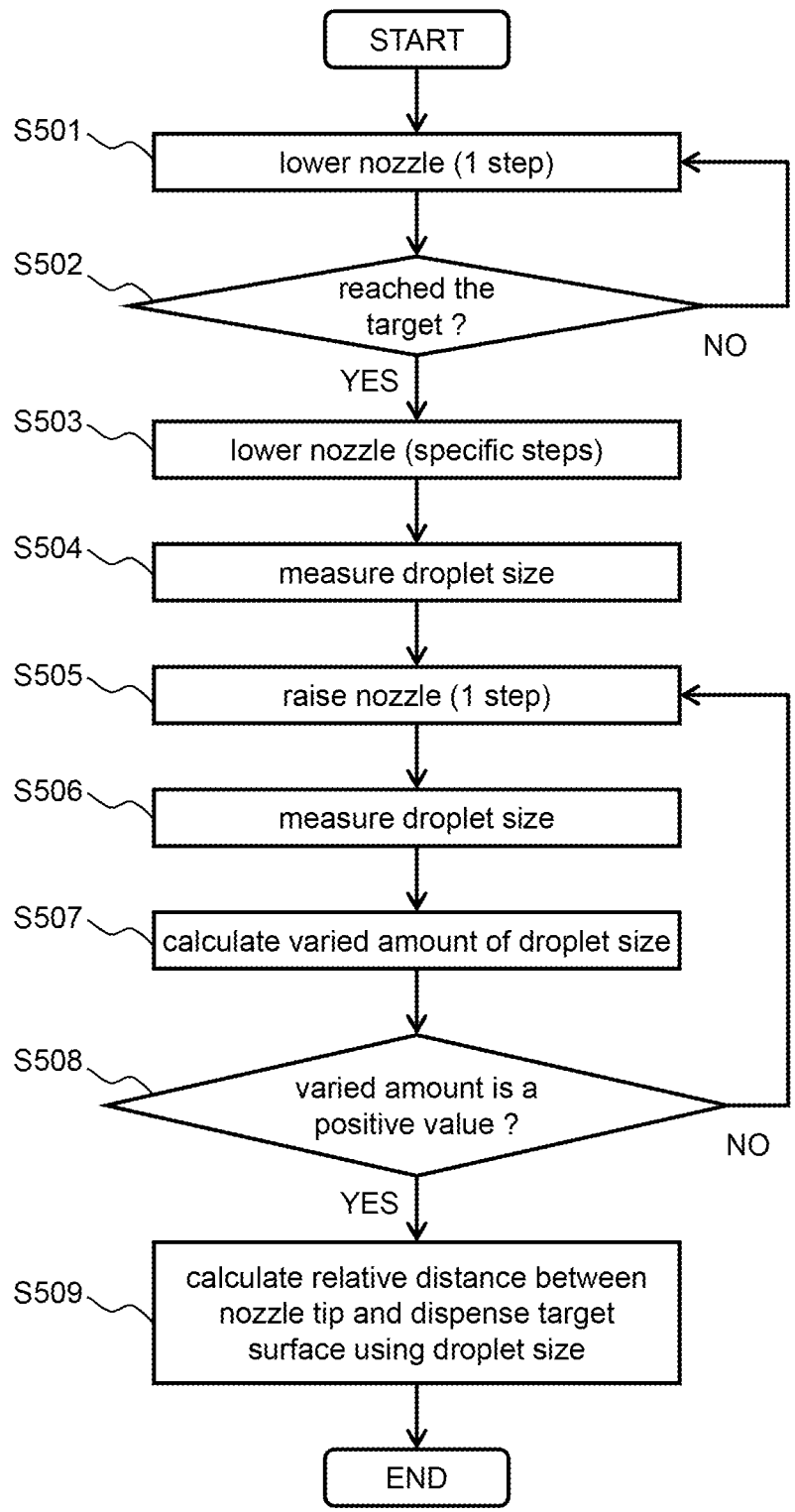
FIG. 5 is a flowchart illustrating a sequence for the dispensing apparatus 100 to calculate the relative distance h.

In order to verify that the relationship between dmin and h is constant, a liquid sample was employed to experimentally measure the relationship between dmin and h using two of the nozzles 104 with thickness of 20 µm (example 1) and 80 µm (example 2). The dispensed volume was 100 nL. As shown in the measured result below, the variation in the relative distance h is approximately 0.040 mm. Thus it is understood that the distance h was measured at nearly same precision as image measurement accuracy.

example 1: $d\text{min}=0.539\pm0.028\text{(mm)}, h=0.824\pm0.036\text{(mm)}$ example 2: $d\text{min}=0.447\pm0.033\text{(mm)}, h=0.830\pm0.040\text{(mm)}$ FIG. 5 is a flowchart illustrating a sequence for the dispensing apparatus 100 to calculate the relative distance h. The dispensing apparatus 100 starts this flowchart when a part of the droplet 201 of the sample is exposed from the tip of the nozzle 104. Hereinafter, each step in FIG. 5 will be described.

(FIG. 5: Step S501)

The processor 111 lowers the nozzle 104 by a minimum movement unit. For example, if the Z axis direction actuator 103 is driven by a stepper motor, the nozzle 104 is lowered by 1 step. For the sake of convenience of description, hereinafter it is assumed that a stepper motor drives the nozzle 104, and that the minimum movement unit=1 step.

(FIG. 5: Step S502)

The processor 111 checks whether the droplet 201 has reached the dispense target 106 according to the image imaged by the imager 301. Since the size d rapidly changes when the droplet 201 reaches the dispense target 106, it is possible to detect whether the droplet 201 has reached the dispense target 106. If the droplet 201 has not reached the dispense target 106, the process returns to step S501 to repeat the same process. If the droplet 201 has reached the dispense target 106, the process proceeds to step S503.

(FIG. 5: Step S503)

The processor 111 lowers the nozzle 104 by s predetermined specific number of steps. This specific number is determined so as to ensure that the droplet 201 reaches the dispense target 106. The specific number can be theoretically calculated according to the dispensed volume and the discharged volume.

(FIG. 5: Step S504)

The processor 111 measures the planar size (diameter) d of the droplet 201 according to the image of the droplet 201 imaged by the imager 301.

(FIG. 5: Steps S505-S507)

The processor 111 raises the nozzle 104 by 1 step (S505). The processor 111 again measures the size d of the droplet 201 (S506). The processor 111 calculates the varied amount of sized by comparing the sizes of droplet 201 in each of steps S504 and S506 (S507).

(FIG. 5: Step S508)

The processor 111 determines whether the varied amount calculated in step S507 is a positive value. If the varied amount is a negative value, it is understood that the droplet 201 is connecting the tip of the nozzle 104 with the dispense target 106 as shown in FIG. 2 center diagram. Thus processor 111 returns to step S505 to raise the nozzle 104 further. If the varied amount is a positive value, it is understood that the nozzle 104 and the dispense target 106 transit from the situation shown in FIG. 2 center diagram to the situation shown in FIG. 2 right diagram (the droplet 201 has been dispensed). Thus the process proceeds to step S509.

(FIG. 5: Step S509)

The processor 111 refers to the data table 113 using the size dmin of the droplet 201, thereby acquiring the corresponding value of the relative distance h. When using the parameters 1-5 mentioned above, these parameters are also specified to acquire the relative distance h.

Figure 6:
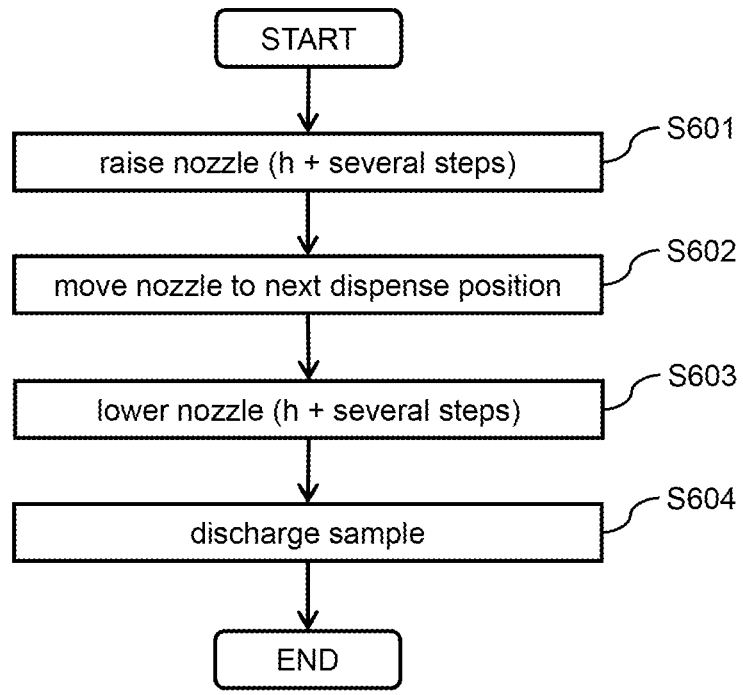
FIG. 6 is a flowchart for the dispensing apparatus 100 to dispense the sample to the next dispense position.

FIG. 6 is a flowchart for the dispensing apparatus 100 to dispense the sample to the next dispense position. The dispensing apparatus 100 performs this flowchart after performing the flowchart of FIG. 5 for the first dispense position. Hereinafter, each step in FIG. 6 will be described.

(FIG. 6: Step S601)

The processor 111 discharges the sample to the dispense target 106, and then raises the nozzle 104 by approximately h+several steps. According to the flowchart of FIG. 5, the distance between the dispense target surface and the tip of the nozzle 104 is h when the nozzle 104 is separated from the droplet 201. Therefore, the nozzle 104 will be theoretically separated from the droplet 201 by raising the nozzle 104 by the distance of h. In order to ensure that the nozzle 104 is separated from the droplet 201, the nozzle 104 is further raised by several steps in this step. If this flowchart is performed next to the flowchart of FIG. 5, the nozzle will be raised by several steps in this step, because the nozzle 104 has already been raised by h in step S509.

(FIG. 6: Steps S602-S604)

The processor 111 moves the nozzle 104 to the next dispense position using the X axis direction actuator 101/Y axis direction actuator 102 (S602). The processor 111 lowers the nozzle 104 by h+several steps (the same steps as in S601) (S603). The processor 111 discharges the sample (S604).

<Embodiment 1: Summary>

The dispensing apparatus 100 according to the embodiment 1: images the size d of the droplet 201 using the imager 301 when dispensing the sample; and acquires the value of dmin and corresponding value of h according to the image. By vertically moving the nozzle 104 using the acquired value of h, it is possible to precisely determine the dispensed volume without physically damaging the tip of the nozzle 104 or the dispense target surface. In other words, it is possible to suppress the variation of dispensed volume within a predetermined range for each dispense action.

The dispensing apparatus 100 according to the embodiment 1 acquires the size d of the droplet 201 using the imager 301, and refers to the data table 113 using the acquired value of d, thereby acquiring the relative distance h. Accordingly, it is possible to precisely determine the dispensed volume without using expensive measuring devices such as laser distance sensors. It is required for the imager 301 only to measure the size d at some precision. Thus relatively cheap devices may be employed as the imager 301 such as CCD cameras.

<Embodiment 2>

Figure 7:
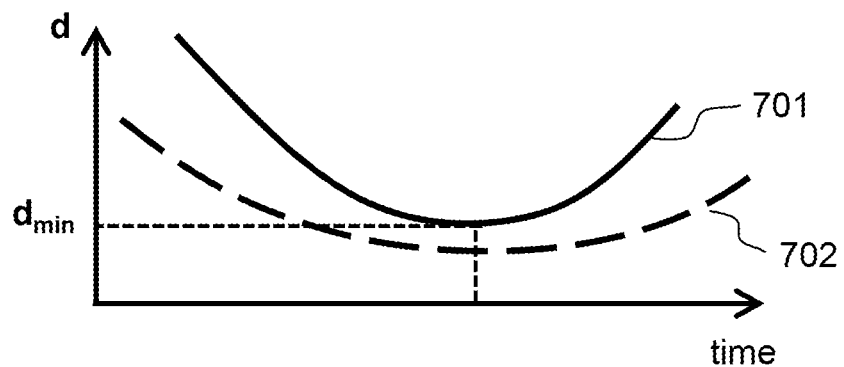
FIG. 7 is a graph illustrating a difference between variation ratios of the size d due to difference of viscosity of the liquid sample.

FIG. 7 is a graph illustrating a difference between variation ratios of the size d due to difference of viscosity of the liquid sample. For the sake of comparison, a graph illustrating a temporal variation ratio of d shown in FIG. 4 is also described in the figure. As shown in FIG. 7, the curve 702 corresponding to high viscosity has a temporal variation ratio of d which is smaller than that of the curve 701 corresponding to low viscosity. Thus the processor 111 can calculate parameters indicating the viscosity of the sample according to the temporal variation ratio of d.

It is not always necessary to calculate the viscosity itself of the sample. Alternatively, some parameters may be acquired that indicate the viscosity relative to that of reference sample. For example, a parameter could be calculated such as: a time period from when the droplet 201 reaches the dispense target 106 to when the size d reaches dmin is 1.2 times longer than the temporal variation ratio of d for the reference sample.

The value of d does not rapidly change when the sample has high viscosity. Thus in order to definitely capture the instant when the droplet 201 is separated from the nozzle 104, it is necessary to slowly raise the nozzle 104. Then a relationship may be described in the data table 113 in advance that describes the relationship between the viscosity of the sample (or some parameter indicating the viscosity) and the speed at which the nozzle 104 is raised. The processor 111 may adjust the speed at which the nozzle 104 is raised according to the described relationship. Thereby it is possible to precisely and certainly calculate the relative distance h.

<Modification of the Present Disclosure>

The present disclosure is not limited to a form of the above-described embodiments, but also includes various modifications. The above embodiments have been described in detail for the purpose of easy explanation of the present disclosure, and are not necessarily limited to that provided with all the described configurations. Moreover, a part of a configuration of one embodiment can be replaced with a configuration of another embodiment. Further, a configuration of one embodiment can be added with a configuration of another embodiment. Furthermore, a part of a configuration of each embodiment can be added, deleted, or replaced with another configuration.

In the embodiments above, an example is described where a planar size (diameter of the droplet 201) is employed as the size d. Alternatively, other similar parameters may be employed. For example, a planar area size of the droplet 201 may be employed.

In step S503, the sample may be discharged while contacting the tip of the nozzle 104 with the dispense target surface, so that the droplet 201 definitely reaches the dispense target 106. In this case, it is desirable to provide a cushion mechanism under the dispense target 106. Accordingly, the nozzle 104 will not be bent when the tip of the nozzle 104 contacts with the dispense target surface.

In the embodiments above, an example is described where each actuator is driven by a stepper motor. If other driving means are employed, the minimum movement unit may be appropriately determined according to the drive precision of that driving means.

The processor 111 may be configured using hardware such as circuit devices implementing the functionality of the processor 111. Alternatively, the processor 111 may be configured using software implementing the functionality of the processor 111 executed by processing devices such as CPU (Central Processing Unit).

DESCRIPTION OF SYMBOLS

100: dispensing apparatus
101: X axis direction actuator
102: Y axis direction actuator
103: Z axis direction actuator
104: nozzle
105: liquid sample container
106: dispense target
107: base stage
108: before-use disposable nozzle container
109: after-use disposable nozzle container
110: stage
201: droplet
301: imager

What is claimed is:

1. A dispensing apparatus that dispenses a liquid sample to a component holding the sample, comprising:
   a nozzle that discharges the sample;
   an imager that images a droplet of the sample discharged to the component; and
   a processor that controls a behavior of the dispensing apparatus,
   wherein the processor measures a size of the droplet using an image of the droplet imaged by the imager,
   wherein the processor calculates a first distance using a size of the droplet when the droplet is separated from a tip of the nozzle, the first distance being a distance between the tip of the nozzle and a dispense target surface to which the droplet is dispensed, and
   wherein the processor dispenses the sample using an image of the droplet imaged by the imager.

2. The dispensing apparatus according to claim 1,
   wherein the processor controls a mechanism that moves the nozzle in a horizontal direction and in a vertical direction, and
   wherein the processor moves the nozzle in the horizontal direction, and discharges the sample after moving the nozzle in the vertical direction using the first distance, thereby limiting, within a predetermined range, an error of liquid volume of the sample dispensed by the nozzle to the component.

3. The dispensing apparatus according to claim 2, further comprising a storage unit that stores data describing a relationship between a size of the droplet when the droplet is separated from the tip of the nozzle and the first distance, wherein the processor refers to the data using the size of the droplet, thereby acquiring the first distance corresponding to the size of the droplet, and wherein the processor moves the nozzle in the vertical direction using the acquired first distance.

4. The dispensing apparatus according to claim 3, wherein the data describes the relationship for each combination of a type of the sample, a liquid volume by which the nozzle discharges the sample, an inner diameter of the nozzle, and a thickness of the nozzle, and wherein the processor acquires the first distance corresponding to the combination by referring to the data using a type of the sample, a liquid volume by which the nozzle discharges the sample, an inner diameter of the nozzle, and a thickness of the nozzle.

5. The dispensing apparatus according to claim 2, wherein the processor raises the nozzle by a second distance after the nozzle discharges the sample, the second distance being a distance calculated by adding a predetermined micro distance to the first distance, wherein the processor moves the nozzle in the horizontal direction to a next dispense position after raising the nozzle by the second distance, and wherein the processor causes the nozzle to discharge the sample at the next dispense position after lowering the nozzle by the second distance.

6. The dispensing apparatus according to claim 3, wherein the data describes the relationship for each material of the component, and wherein the processor refers to the data specifying the each material of the component, thereby acquiring the first distance corresponding to the each material of the component.

7. The dispensing apparatus according to claim 1, wherein the imager images a variation of size of the droplet while the nozzle is discharging the sample, and wherein the processor calculates a viscosity parameter that indicates an intensity of viscosity of the sample according to a temporal variation ratio of size of the droplet imaged by the imager.

8. The dispensing apparatus according to claim 7, wherein the larger the viscosity of the sample is, the slower the processor sets a speed at which the nozzle is raised after discharging the sample.

9. The dispensing apparatus according to claim 8, further comprising a storage unit that stores a data table describing a relationship between the viscosity parameter and a speed at which the nozzle is raised, and wherein the processor refers to the data table using a variation ratio of the size of the droplet, thereby acquiring the speed corresponding to the variation ratio, and raises the nozzle at the acquired speed.

10. The dispensing apparatus according to claim 1, wherein the processor determines whether the sample has contacted with the component according to the size of the droplet imaged by the imager, and wherein the processor lowers the nozzle by a predetermined amount if the sample has not contacted with the component.

11. The dispensing apparatus according to claim 1, wherein the nozzle and the imager are arranged to sandwich the component, wherein the nozzle dispenses the sample so that the sample contacts with one surface of the component, and wherein the imager images the sample from another surface of the component.

* * * * *